Jan. 5, 1965    N. H. SWANSON    3,164,233
PLURAL REVOLUTION CLUTCH
Filed Dec. 17, 1962    4 Sheets-Sheet 1

INVENTOR
N. H. SWANSON
BY
W. M. Kam
ATTORNEY

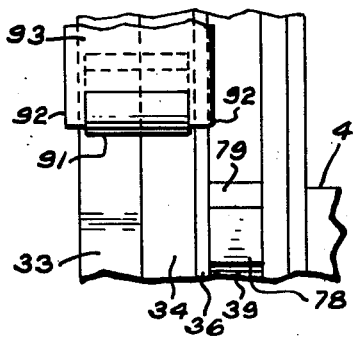
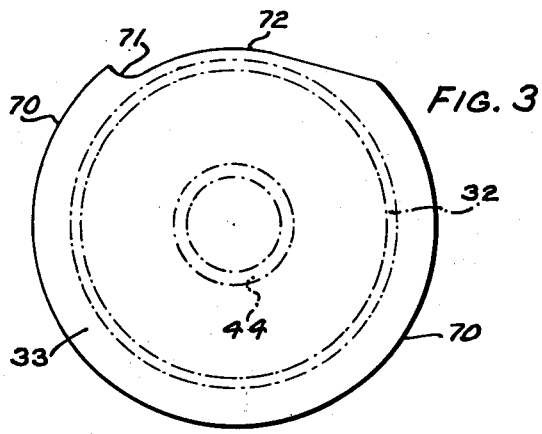
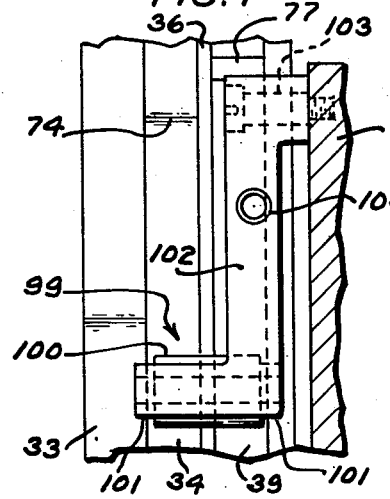
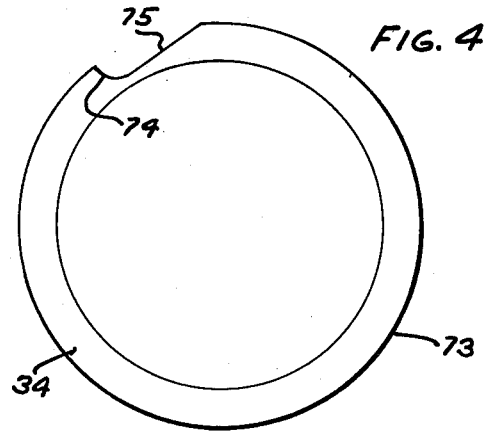
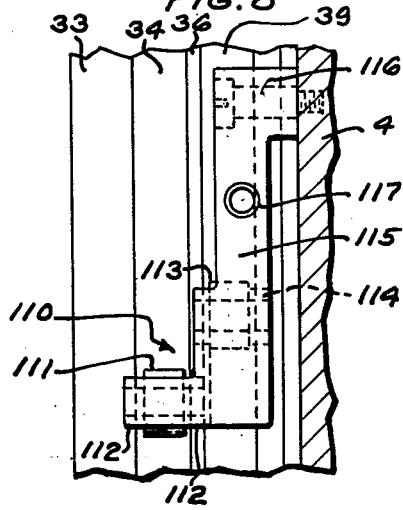
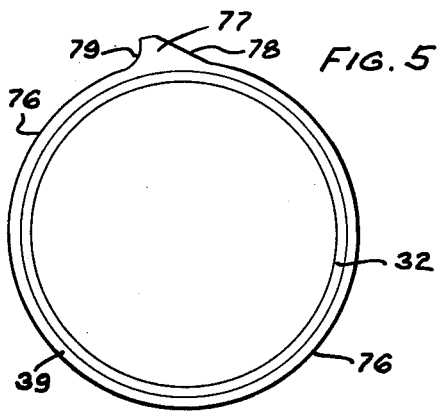

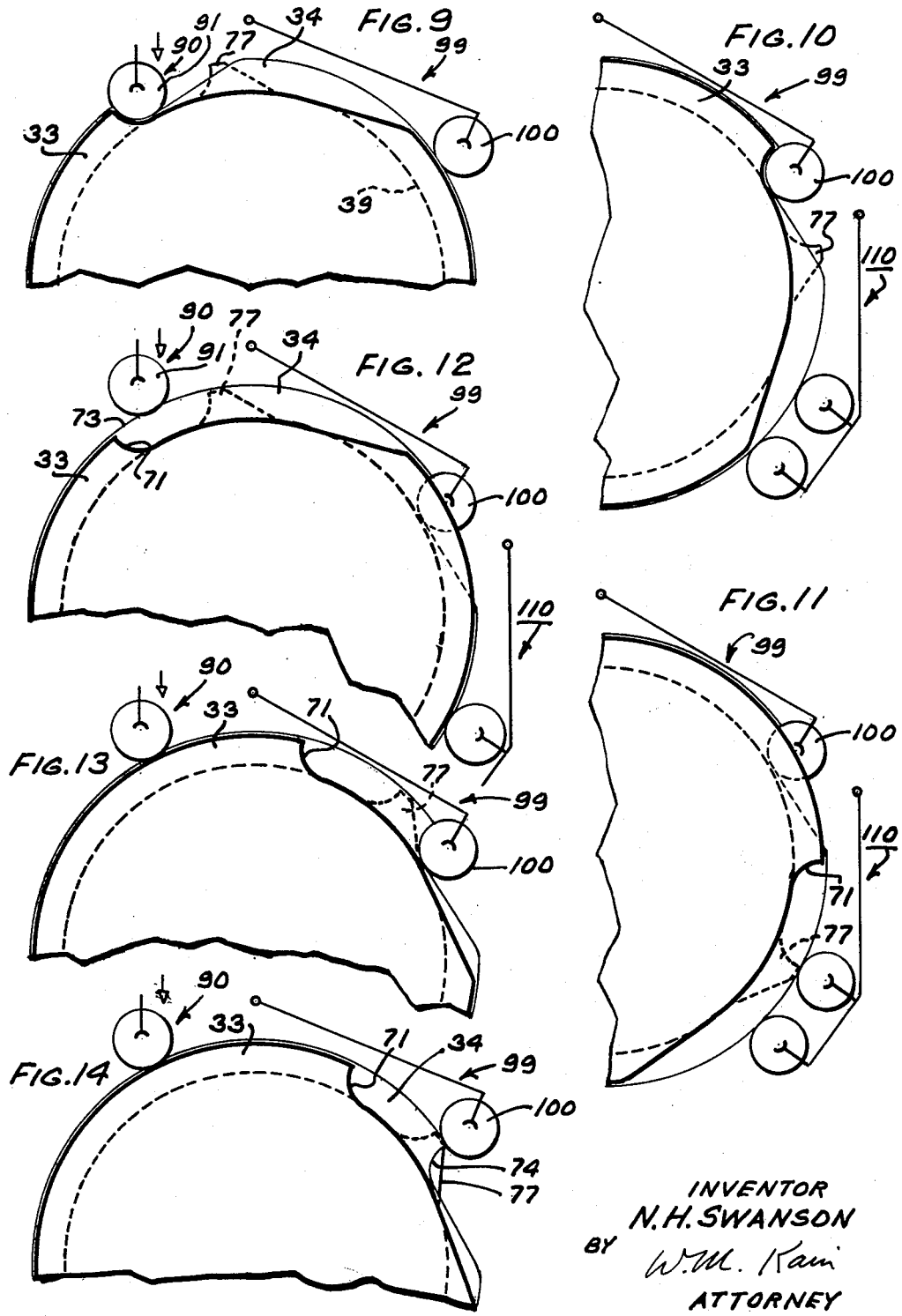

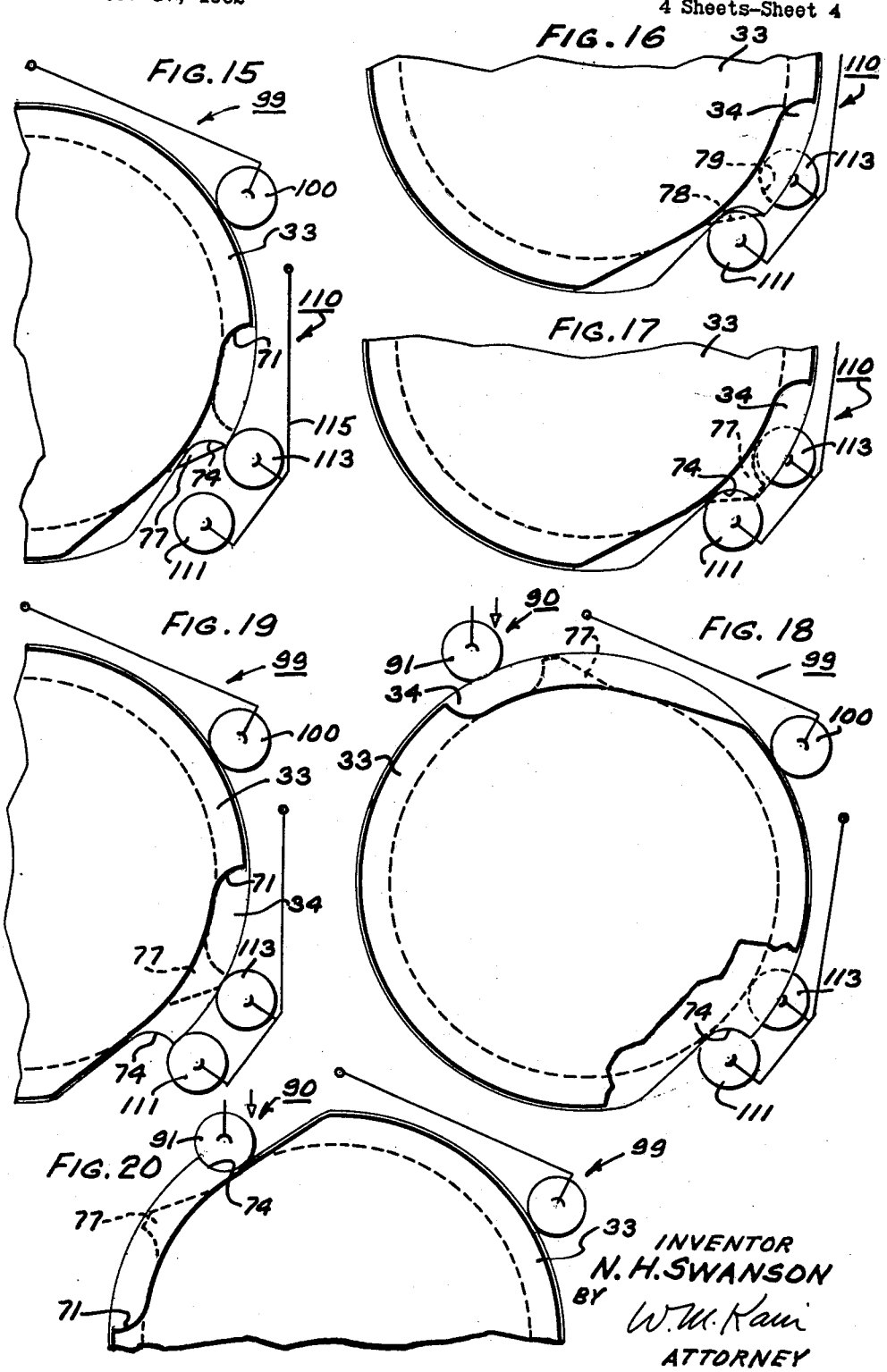

United States Patent Office 3,164,233
Patented Jan. 5, 1965

3,164,233
PLURAL REVOLUTION CLUTCH
Nils H. Swanson, La Grange, Ill., assignor to Western
Electric Company, Incorporated, New York, N.Y., a
corporation of New York
Filed Dec. 17, 1962, Ser. No. 245,076
5 Claims. (Cl. 192—33)

This invention pertains to a plural revolution clutch, and more particularly to a plural revolution clutch which imparts a predetermined number of revolutions of rotative power to a load.

It is often desirable in industrial operations to couple the rotative energy of a power source, such as an electric motor, to a load in such a way that only a predetermined number of revolutions are imparted to the load. In punch presses, for example, it is usually desired to impart one full rotation to the press to cause the press to run through one punching cycle. However, in other machines, such as automatic workpiece transferring equipment in which various coordinated movements must be intermittently imparted to the workpieces, it is desirable to deliver a predetermined number of rotations from a source of rotative power.

Accordingly, it is an object of this invention to provide a new and improved plural revolution clutch.

It is a further object of this invention to provide a new and improved clutch, the driven portions of which are restrained against rotation except during the transmission of a predetermined number of revolutions of rotative power through the clutch.

It is an additional object of this invention to provide an improved clutch in which means for restraining and permitting the rotation of the driven portions of the clutch control the coupling and uncoupling of the clutch to impart a predetermined number of revolutions of rotative power to a load.

With these and other objects in mind, this invention contemplates a clutch including a rotatable driving portion, a rotatable driven portion, and facilities for coupling the driving and driven portions of the clutch to transmit rotative energy to a load. A detent is provided to restrain the driven portion against rotation. Disabling facilities are provided for preventing the detent from restraining the driven portion against rotation for a predetermined number of revolutions thereof.

In further refinements, the driven portion of the clutch may have fixed thereto a circular, peripherally notched, cam. A second circular cam having a peripheral recess is mounted on the driven portion for rotation therewith in the absence of an arresting force. The notch and recess are alignable and the detent acting upon the cams, when the notch and recess are aligned, restrains the rotation of the driven portion of the clutch. The disabling means, which may include a plurality of counting detents, prevent the alignment of the notch and recess until the driven portion has completed a predetermined number of revolutions.

In a still further refinement, the detent, as it takes positions restraining or releasing the rotation of the driven portion of the clutch controls the facilities which couple and uncouple the driving and driven portions of the clutch.

Other objects and advantages of this invention will be apparent from the following detailed description when considered in conjunction with the accompanying drawings, in which:

FIGS. 3-5 illustrate the respective individual shapes of the cams which are illustrated in assembled relations in FIG. 2;

FIG. 6 is a fragmentary view taken along line 6—6 of FIG. 2 showing the detent overlying the camming surface of the cams illustrated in FIGS. 2 and 3;

FIG. 1 is a fragmentary view taken along line 7—7 of FIG. 2 showing a first counting detent engaging two of the cams illustrated in FIGS. 2, 4, and 5;

Figure 2:
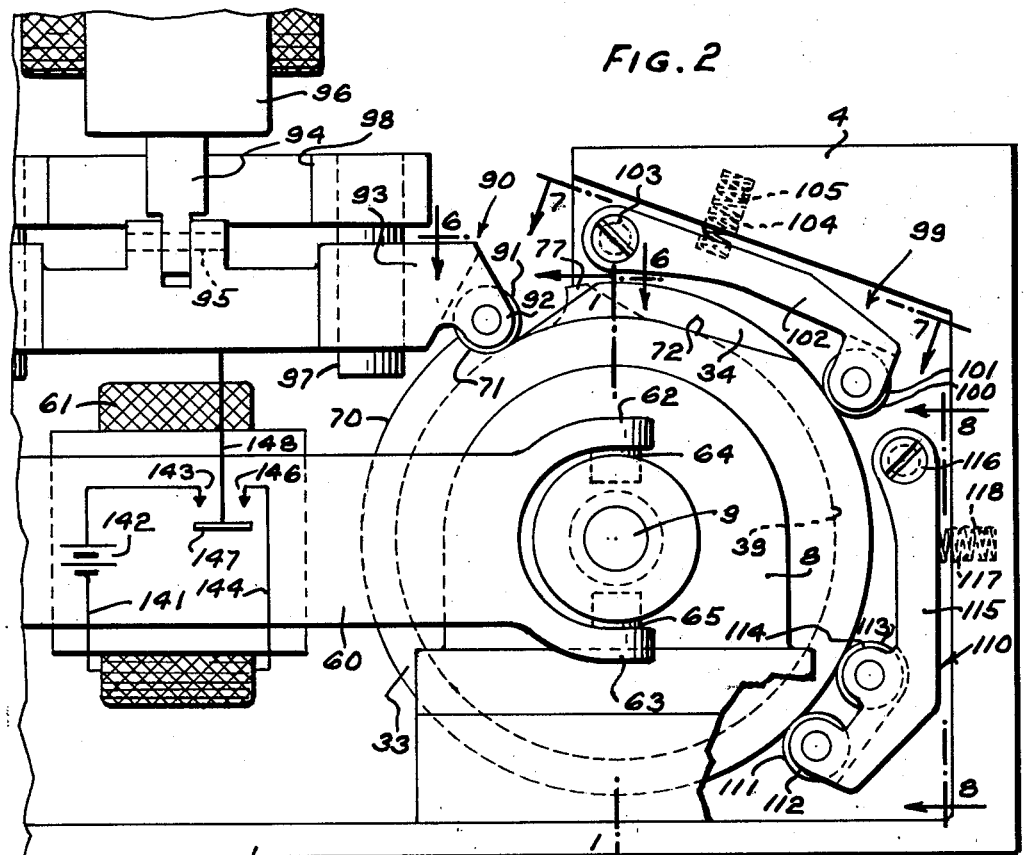
FIG. 2 is an end elevation of the clutch shown in FIG. 1, illustrating a detent for restraining the rotation of the driven portion of the clutch, and cams and counting detents which act to disable the detent for a predetermined number of revolutions of the driven portion.

FIG. 8 is a fragmentary view taken along line 8—8 of FIG. 2 showing a second counting detent having staggered rollers thereon which rollers engage two of the cams illustrated in FIGS. 2, 4, and 5; and FIGS. 9–20 are schematic representatives of the cams shown in FIGS. 2–8 showing the step-by-step action of the counting detents on the cams in limiting the number of revolutions transmitted through the clutch to the load.

Figure 1:
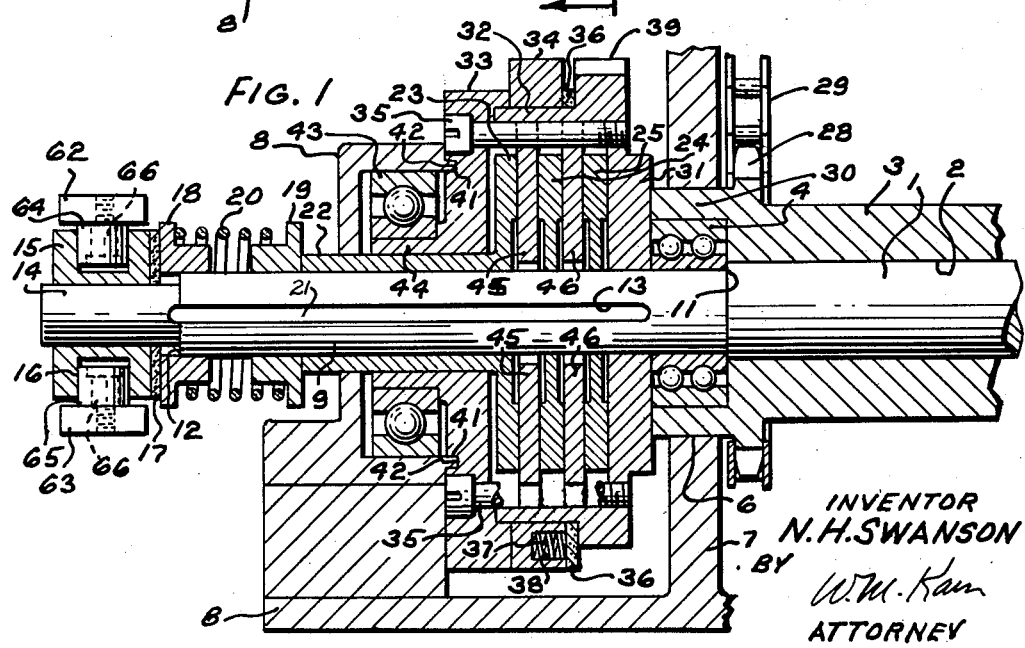
FIG. 1 is a side elevation, partially in section, of a clutch according to this invention, showing the driven and driving portions thereof and facilities for coupling the driven and driving portions together.

Referring to FIG. 1, a driving axle 1 is journaled for rotation in a bore 2 within a driven shaft 3 by means of a ball bearing 4. The driven shaft 3 is rotatably mounted within a simple bearing 6 which is supported within a wall 7 of a stationary housing 8. The driving axle is connected to a source of rotative power, for example an electric motor (not shown), mounted to the right as viewed in FIG. 1.

Driving axle 1 includes an intermediate portion 9 extending between shoulders 11 and 12 formed on the driving axle. A longitudinal keyway 13 is cut into the intermediate portion 9. Projecting from the intermediate portion, beyond shoulder 12, is an end portion 14 of reduced diameter.

A wheel 15 having a circumferential groove 16 formed therein is mounted for free rotation about end portion 14. Wheel 15 is provided with a low friction facing 17 which bears against the side face of a collar 18. Collar 18 and a collar 19, separated as shown in FIG. 1 by a cushioning spring 20, are mounted on intermediate portion 9 of the driving axle by means of a key 21 which engages a keyway (not shown) in each of collars 18 and 19 and is seated within keyway 13. It will be seen that collars 18 and 19 are free to slip longitudinally along intermediate portion 9, but are locked against rotation thereabout by key 21.

A hollow shaft 22, having an integrally formed friction disk 23 projecting radially therefrom, and friction disks 24 and 25 are also mounted along the intermediate portion of the driving axle by means of key 21. Hollow shaft 22, and friction disks 23–25 are also restrained against rotational movement about driving shaft 1 by key 21, but are free to move therealong in the longitudinal direction.

The elements described above generally comprise the driving portion of the clutch under discussion.

Turning now to the driven portion of the clutch, driven shaft 3 (FIG. 1) is equipped with a power take-off sprocket 28 and a power take-off chain 29. Chain 29 is connected to a suitable sprocket (not shown) on load apparatus which is to be driven by rotation transmitted through the clutch.

Driven shaft 3 includes a hollow annular bearing housing 30 in which bearing 4 is nested. A hub 31 having a hollow, cylindrical, annular extension 32 projecting therefrom is rigidly fixed to bearing housing 30.

A cam 33 (FIGS. 1, 2, and 3) having a generally circular periphery is mounted against extension 32. A second cam 34 (FIGS. 1, 2, and 4) having a generally ring-like shape and a circular periphery is mounted for rotation about extension 32. Bolts 35 fix cam 33 to hub 31 and thereby also retain cam 34 in place. Cam 34 is provided with a high friction facing 36 on one side thereof. A compression spring 37 mounted within a bore 38 in cam 34 biases the friction facing to the right as viewed in FIG. 1. A third cam 39 formed integrally with hub 31 and extension 32 engages friction facing 36. It will be noted that cams 33 and 39 are locked together by bolts 35. Cam 34, on the other hand, is coupled to cams 33 and 39 only by the frictional forces between friction facing 36, as the facing is biased by spring 38 against the side of cam 39. Thus, in the absence of an arresting force sufficient to overcome such friction, cam 34 will rotate with cams 33 and 39.

Cam 33 is provided with annular sealing groove 41 (FIG. 1) which in turn accommodates sealing rib 42 which is formed within housing 8. A ball bearing 43 is mounted on a cylindrical projection 44 extending from cam 33. This bearing supports the driven portions of the clutch for rotation within housing 8.

Two friction disks, 45 and 46 are nested within cylindrical extension 32 of hub 31 in interleaved relation with friction disks 23, 24, and 25. Friction disks 45 and 46 are notched about their peripheries so as to accommodate bolts 35. These bolts prevent rotation of friction disks 45 and 46 relative to hub 31, but allow friction disks 45 and 46 freedom to move in the axial direction of driven shaft 3.

As best seen in FIG. 2, a clutch throw out arm 60 is mounted for movement into and out of the plane of FIG. 2 under the control of solenoid 61. Spring means (not shown) bias arm 60 toward the viewer of FIG. 2. Arm 60 is provided with bifurcations 62 and 63 on which a pair of rollers 64 and 65 are mounted by means of threaded studs 66 (FIG. 1). Rollers 64 and 65 fit within circumferential groove 16 in wheel 15.

From the foregoing descriptions of the driving and driven portions of the clutch under discussion, it should be seen that energizing solenoid 61 to pull arm 60 into the plane of FIG. 2 causes wheel 15 to move to the right as viewed in FIG. 1. Such movement is imparted through low friction facing 17, to collar 18, via spring 20 to collar 19, thence to hollow shaft 22. Movement of hollow shaft 22 to the right as viewed in FIG. 1 brings into close contact friction disks 23, 24, and 25 on driving axle 1, and friction disks 45 and 46 which are locked to rotate with driven shaft 3. Such engagement of the interleaved friction disks serves to couple and interconnect the driving portion with the driven portion of the clutch and thereby transmit rotation from the power source to the load. Conversely, deenergizing solenoid 61 serves to release arm 60 and disconnect the driving and driven portions of the clutch.

The camming surfaces of cams 33, 34, and 39 are best understood by referring to FIGS. 2–5. Cam 33 (FIGS. 1, 2, and 3) is provided with a camming surface comprising round portion 70 and a cutaway portion defined by a rounded notch 71 and a convex slope 72. Cam 34 (FIGS. 1, 2, and 4) is provided with a camming surface comprising a round portion 73 having the same diameter as round portion 70 on cam 33 and a cutaway portion defined by rounded recess 74 and sloping plane 75. Cam 39 is provided with a round portion 76 having a diameter less than that of the round portions 70 and 73 of cams 33 and 34. Cam 39 also includes a lug 77 defined by slope 78 and rounded fall 79. The height of lug 77, as measured from the center of cam 39 is equal to the radius of round portions 70 and 73 on cams 33 and 34 (FIG. 2).

As indicated above, the surfaces of cams 33 and 39 are unmovable relative to one another because of connecting bolts 35. Assuming a clockwise rotation of cams 33 and 39, as seen in FIG. 2, lug 77 on cam 39 is somewhat advanced of notch 71 on cam 33, but is generally aligned with convex slope 72. Cam 34, on the other hand, may be rotated relative to cams 33 and 39 by overcoming the frictional forces afforded by friction surface 36.

As best seen in FIGS. 2 and 6, a detent 90, including an elongated roller 91 mounted for rotation within bifurcations 92 on a detent arm 93, is mounted so that roller 91 is normally gravity biased into engagement with the camming surfaces of cams 33 and 34. An armature 94 (FIG. 2) is connected to detent arm 93 by means of a pin 95 so as to be actuable by a solenoid 96 to move detent arm 93 in the vertical plane as seen in FIG. 2 and thus lift roller 91 from engagement with these camming surfaces. Movement of detent 90 is constrained to the vertical by a guide rod 97 which, in turn, is rigidly connected to housing 8 by means of a rigid mounting arm 98.

Roller 91 is supported by detent arm 93 over the camming surfaces of cams 33 and 34, but not in the path of cam 39. The radius of roller 91 is equal to the radii of notch 71 and round 74. Thus, in its lowermost position (FIG. 2) detent 90 engages notch 71 and recess 74 and prevents their rotation in the clockwise (normal) direction of rotation.

A first counting detent 99 (FIGS. 2 and 7), including an elongated roller 100 nested within bifurcations 101 formed on a detent arm 102, is mounted for rotation about a pin 103 which, in turn, is fixed to housing 8. Detent arm 102 is biased downwardly as viewed in FIG. 2 by means of a spring 104 within a bore 105 in housing 8. Counting detent 99 is mounted so that roller 100 is normally biased into engagement with the camming surface of cam 34 (FIG. 7) and extends into the path of movement of lug 77 on cam 39 when within recess 74.

A second counting detent 110 (FIGS. 2, 8), including a roller 111 nested within bifurcations 112, and a roller 113 nested within bifurcations 114; such bifurcations being formed on a detent arm 115 mounted for rotation about a pin 116 fixed rigidly to housing 8. Detent arm 115 is biased in the clockwise direction about pin 116 (FIG. 2) by means of spring 117 within bore 118 in housing 8.

As best seen in FIG. 8, rollers 111 and 113 are mounted in a staggered relation; roller 111 being more advanced in the clockwise (normal) direction of rotation of the cams (as viewed in FIG. 2) and engageable with the camming surface of cam 34; roller 113 being less advanced in the normal direction of rotation and being in the plane of rotation of cam 39. The spacing of rollers 111 and 113 is equal to, or slightly greater than, the length of lug 77 as measured on the periphery of round portion 76 of cam 39. When roller 111 is within recess 74 in cam 34, roller 113 lies in the path of lug 77.

The relationship of detent 90 and counting detents 99 and 110 relative to cams 33, 34, and 39 may be further explained with reference to FIGS. 6, 7, and 8. Roller 91, being biased to engage the camming surfaces of cams 33 and 34, will enter notch 71 and recess 74 of cams 33 and 34 and restrain these cams against rotation when, and only when, both the notch and recess are in aligned relation substantially as shown in FIG. 2. However, if the notch and recess are disaligned, roller 91 will be supported in raised position by either or both of the round portions 70 and 73 of cams 33 and 34 and will not interfere with the rotation of these cams. Of course, when solenoid 96 is actuated to lift detent 90 up from its lowermost, rotation locking, position, the roller detent will not interfere with the rotation of cams 33 and 34.

The left-hand portion of roller 100 (FIG. 7) and roller 112 (FIG. 8) are spring-biased into engagement with the camming surfaces of cam 34 and either of these rollers will arrest the rotation of cam 34 when in engagement with recess 74. The right-hand portion of roller 100 (FIG. 7) is in the plane of rotation of cam 39, and, when roller 100 is within recess 74 in cam 34, it is in the path of lug 77 on cam 39. Lug 77 is sufficiently high to lift roller 100 out of recess 74. Likewise, when roller 111 (FIG. 8) is within recess 74, roller 113 lies in the path of lug 77. Acting on roller 113, lug 77 is sufficiently high to lift roller 111 from recess 74.

Referring to FIG. 2, it will be seen that a lead 141 of solenoid 61 is connected in series with a source of direct current 142 and a contact 143. The other lead 144 of the solenoid terminates in contact 146. A conductive contact bar 147 is mechanically linked to detent arm 93 by means of insulating link 148. Thus, when detent 90 is in the rotation locking position (FIG. 2) no closed circuit path exists to energize solenoid 61. However, when detent 90 is raised to its rotation releasing position, that is when roller 91 rides on the round portions of either of cams 33 or 34, bar 147 is raised to complete this circuit, energize solenoid 61, and thereby cause the driving and driven portions of the clutch to be coupled.

*Operation*

The operation of the above-described embodiment of this invention is as follows. The source of rotative power (not shown) is energized to rotate driving axle 1 in the normal direction, clockwise as viewed in FIG. 2. This rotary motion is imparted to collars 18 and 19 and friction disks 23-25.

Assuming that cams 33, 34, and 39 are in the positions shown in FIG. 2, solenoid 96 is energized (by means not shown) to raise detent 90 and lift roller 91 from notch 71 and recess 74 in cams 33 and 34. This movement also draws link 148 and bar 147 upward to complete the energizing circuit of solenoid 61. Solenoid 61 is energized by potential source 142 to move clutch arm 60, rollers 64 and 65, and wheel 15 to the right as viewed in FIG. 1. Low friction facing 17 is brought into contact with collar 18 moving it to the right (FIG. 1), compressing spring 20, and causing collar 19 and hollow shaft 22 to move to the right. Friction disks 23-25 are thereby forced into frictional engagement with friction disks 45 and 46 and impart rotation thereto. Cams 33, 34, and 39 are driven into rotation. Rotation imparted to friction disks 45 and 46 is transmitted to driven shaft 3, sprocket 28, and through chain 29 to the load.

As suggested above, it is the function of cams 33, 34, and 39, acting in cooperation with detents 90, 99, and 110 to limit, and in effect count, the number of revolutions imparted to the load. This action may be understood by referring to FIGS. 9-20.

FIG. 9 shows the cams restrained against motion by detent 90. When solenoid 96 is actuated to lift detent 90 and rotational motion is imparted to the cams, all three cams rotate together in the normal, clockwise direction.

After the cams have rotated about 90°, solenoid 96 is denergized (by means not shown) and roller 91 drops to a position of engagement with round portions 70 and 73 of cams 33 and 34.

When recess 74 of cam 34 reaches roller 100, counting detent 99 is forced by spring 104 into the recess to arrest cam 34 (FIG. 10). Cams 33 and 39 continue to rotate (FIG. 11) because cam 34 is connected thereto only by means of the frictional forces afforded by friction facing 36.

At the completion of one complete revolution (FIG. 12) cam 34 remains held against rotation by counting detent 99 and detent 90 is prevented from dropping into notch 71 of cam 33 by round portion 73 of cam 34. After a further rotation of cams 33 and 39 of about 90°, lug 77 of cam 39 arrives at the position of counting detent 99 (FIG. 13), lifts it (FIG. 14), thus freeing cam 34 to rotate together with cams 33 and 39. At this point, recess 74 in cam 34 and slope 78 of lug 77 are aligned.

Slope 78, acting on roller 113 lifts detent arm 115 (FIG. 15); however, once lug 77 has passed roller 113, roller 113 is permitted to drop behind fall 79. As seen in FIG. 16, this action permits detent arm 115 to drop and roller 111 to engage recess 74 and again arrest the rotation of cam 34 (FIG. 17).

With the rotation of cam 34 arrested, cams 33 and 39 continue to rotate. The position of the cams at the end of the second complete revolution of the driven portions of the clutch is shown in FIG. 18. Round portion 70 of cam 33 and round portion 73 of cam 34 prevent detents 90 and 99 from interfering with the rotation of the cams.

Rotation of cams 33 and 39 continues and lug 77 engages roller 113 to lift detent 110 and disengage roller 111 from recess 74 in cam 34 (FIG. 19). Cam 34 is now free to rotate with cams 33 and 39. Due to the fixed position of lug 77 relative to the cutaway portion of cam 33 (defined by round notch 71 and convex slope 72), this cutaway portion and recess 74 in cam 34 are in alignment when detent 110 is lifted.

All three cams continue to rotate together toward the completion of the third complete revolution of the driven portion of the clutch. Shortly before this point, the cutaway portion of cam 33 arrives at roller 91 and detent 90 is permitted to drop into the path of notch 74 of cam 34 and stop the rotation thereof (FIG. 20). As detent 90 drops into rotation locking position link 148 and bar 147 are carried with it. Bar 147 is moved out of contact with contacts 143 and 146 and solenoid 61 is deenergized. Under the influence of spring means (not shown), arm 60 moves to the left (FIG. 1) to disengage the driving and driven portions of the clutch. The momentum of cams 33 and 39 causes these cams to continue to rotate until notch 71 of cam 33 engages roller 91. Thus, at the end of the third complete revolution, the rotation of the driven portion of the clutch is sharply arrested and the cams have returned to their starting positions (FIG. 9) in readiness to commence the next plural revolution cycle.

From the foregoing description of the operation of this clutch, it should be apparent that the driven portions of the clutch, once started in motion, continue to rotate until the cutaway portion of cam 33 and the recess in cam 34 are sufficiently aligned that roller 91 can drop into both and arrest the motion of all cams. Conversely, the prevention of this state of alignment permits the driven portions of the clutch to continue to rotate. In the above-discussed embodiment, this state of alignment is prevented for three complete revolutions of the driven portions of the clutch by the successive arresting and releasing of cam 34 by the counting detents. This action serves to disable detent 90 from restraining the rotation of the driven portion for three revolutions thereof.

If it were desired to impart more than three revolutions to the driven portions of the clutch, additional detents performing the same function as detent 99 may be interposed between detent 90 and detent 110. For each such additional detent, the driven portions of the clutch will be permitted one additional complete revolution.

It is to be understood that the above-described arrangements of apparatus and construction of elemental parts are simply illustrative of an application of the principles of the invention and many other modifications may be made without departing from the invention.

What is claimed is:

1. In a clutch including a rotatable driving portion, a rotatable driven portion and means for coupling the driving portion to the driven portion, the combination of
   a circular cam fixed to the driven portion for rotation therewith and having a notch in the periphery thereof,
   a second circular cam mounted for rotation about the driven portion and having a recess in the periphery thereof alignable with said notch,
   a detent engageable with said recess and said notch for restraining said driven portion against rotation only when said notch and recess are aligned, and
   disabling means including a plurality of counting detents engageable with said recess for successively arresting the rotation of said second cam and preventing the alignment of said notch and said recess until said driven portion has completed a predetermined number of revolutions.

2. In a clutch including a rotatable driving portion, a rotatable driven portion and means for coupling the driving portion to the driven portion, the combination of
   a circular cam fixed to the driven portion for rotation therewith and having a notch in the periphery thereof,
   a second circular cam mounted on said driven portion for rotation therewith in the absence of an arresting force, said second cam having a recess in the periphery thereof alignable with said notch,
   a detent engageable with said recess and said notch for restraining said driven portion against rotation only when said notch and recess are aligned, and
   disabling means for arresting the rotation of said second cam and preventing the alignment of said notch and said recess until said driven portion has completed a predetermined number of revolutions.

3. In a clutch including a rotatable driving portion, a rotatable driven portion and means for coupling the driving portion to the driven portion, the combination of
   a circular cam fixed to the driven portion for rotation therewith and having a notch in the periphery thereof,
   a second circular cam mounted on said driven portion for rotation therewith in the absence of an arresting force, said second cam having a recess in the periphery thereof alignable with said notch,
   a detent engageable with said recess and said notch for restraining the rotation of said driven portion only when said notch and recess are aligned,
   disabling means including a plurality of counting detents spaced around the periphery of said second cam and biased to engage said recess and arrest the rotation of said second cam, and
   lug means mounted on said driven portion for successively releasing each of said plurality of counting detents, one detent being released for each revolution of the driven portion, and for releasing the last-most counting detent when said notch and said recess are in alignment.

4. In a clutch including a rotatable driving portion, a rotatable driven portion and means for coupling the driving portion to the driven portion, the combination of
   a first circular cam fixed to the driven portion for rotation therewith and having a notch in the periphery thereof,
   a second circular cam equal in diameter to said first cam frictionally mounted on said driven portion for rotation therewith in the absence of an arresting force, said second cam having a recess in the periphery thereof alignable with said notch,
   a detent engageable with said recess and said notch for restraining the rotation of said driven portion only when said notch and recess are aligned,
   disabling means including a plurality of counting detents spaced around the periphery of said second cam and biased to engage said recess and arrest the rotation of said second cam,
   a third cam fixed to said driven portion having a lug extending from the periphery thereof, said lug being aligned with said notch for successively releasing each of said plurality of counting detents, one detent being released for each revolution of the driven portion, and for releasing the last most detent when said notch and said recess are in alignment.

5. A clutch in accordance with claim 4, wherein said plurality of counting detents comprises
   a first counting detent including an elongated roller for engaging said recess and extending in the path of said lug, and
   a second counting detent having two staggered rollers thereon, the first of said staggered rollers being advanced of the second of said staggered rollers by an amount corresponding to the width of said lug and extending only in the path of said second cam, the second of said staggered rollers extending only in the path of said third cam.

References Cited in the file of this patent

UNITED STATES PATENTS

| 1,777,796 | Hubbell | Oct. 7, 1930 |
| 1,795,420 | Beall | Mar. 10, 1931 |
| 2,267,415 | Myers | Dec. 23, 1941 |

FOREIGN PATENTS

| 477,695 | Great Britain | Jan. 5, 1938 |